United States Patent
Kahlman et al.

(10) Patent No.: US 9,357,607 B2
(45) Date of Patent: May 31, 2016

(54) LED LIGHT SOURCE

(75) Inventors: Henricus Marius Joseph Maria Kahlman, Dongen (NL); Ralph Kurt, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 148 days.

(21) Appl. No.: 14/124,733

(22) PCT Filed: Jun. 4, 2012

(86) PCT No.: PCT/IB2012/052790
§ 371 (c)(1),
(2), (4) Date: Dec. 9, 2013

(87) PCT Pub. No.: WO2012/168844
PCT Pub. Date: Dec. 13, 2012

(65) Prior Publication Data
US 2014/0103823 A1    Apr. 17, 2014

Related U.S. Application Data

(60) Provisional application No. 61/576,379, filed on Dec. 16, 2011.

(30) Foreign Application Priority Data

Jun. 10, 2011  (EP) ..................................... 11169498

(51) Int. Cl.
H05B 37/04    (2006.01)
H05B 33/08    (2006.01)

(52) U.S. Cl.
CPC .......... *H05B 33/0845* (2013.01); *H05B 33/083* (2013.01); *H05B 33/0812* (2013.01); *H05B 33/0815* (2013.01); *Y02B 20/347* (2013.01); *Y02B 20/348* (2013.01)

(58) Field of Classification Search
CPC ......... H05B 37/04; H05B 39/04; Y02B 20/72
See application file for complete search history.

(56) References Cited

U.S. PATENT DOCUMENTS 7,081,722 B1    7/2006 Huynh et al.

9,113,524 B2 *  8/2015 Kurt ..................... H05B 33/083

(Continued)

FOREIGN PATENT DOCUMENTS

CN    101795519 A    8/2010
WO    2005115058 A1    12/2005

(Continued)

*Primary Examiner* — Hai L Nguyen

(57) ABSTRACT

A LED light source comprises—a full bridge rectifier equipped with a first input terminal and a second input terminal for coupling to output terminals of the phase cut dimmer, —a series arrangement comprising N LED loads, a first and second end of said series arrangement being coupled to a first output terminal and a second output terminal of the full bridge rectifier respectively, —control means for during a period of the rectified AC supply voltage subsequently making the LED loads comprised in the first series arrangement carry a current, one by one and in dependency of the momentary amplitude of the rectified AC supply voltage when the momentary amplitude increases and for subsequently making the LED loads stop carrying a current, one by one, and in dependency of the momentary amplitude of the rectified AC supply voltage when the momentary amplitude decreases, said control means controlling the current through the LED loads at zero when the output voltage of the phase cut dimmer equals zero and controlling the current through the LED loads at a value that is independent from the phase angle of the phase cut dimmer when the output voltage of the phase cut dimmer differs from zero Volt. In order to make the LED light source compatible with a phase cut dimmer, the LED light source is further equipped with—a switchable bleeder current source coupled between the first and second output terminal of the full bridge rectifier, —a latch coupled between the first and second output terminals of the full rectifier bridge and comprising a series arrangement of a resistor and a capacitor to prevent the current through the dimmer from crossing zero after a leading edge generated by the phase cut dimmer, in case the phase cut dimmer is a leading edge phase cut dimmer, —a unidirectional element arranged in series with the capacitor for preventing discharging of the capacitor via the LED loads or the adjustable bleeder current source, and—a clamp circuit coupled to the capacitor and comprising a current source for discharging the capacitor and providing a low ohmic path for the dimmer current when the dimmer is off.

13 Claims, 7 Drawing Sheets

(56) References Cited

U.S. PATENT DOCUMENTS

| | | |
|---|---|---|
| 2008/0224629 A1 | 9/2008 | Melanson |
| 2009/0096384 A1 | 4/2009 | Vanderzon |
| 2009/0122580 A1 | 5/2009 | Stamm et al. |
| 2010/0181935 A1 | 7/2010 | Wu |
| 2010/0295478 A1 | 11/2010 | Wei et al. |
| 2010/0308739 A1 | 12/2010 | Shteynberg et al. |
| 2011/0266967 A1 | 11/2011 | Bordin et al. |

FOREIGN PATENT DOCUMENTS

| | | |
|---|---|---|
| WO | 2011045371 A1 | 4/2011 |
| WO | 2011050453 A1 | 5/2011 |
| WO | 2011084525 A1 | 7/2011 |

* cited by examiner

LED LIGHT SOURCE

FIELD OF THE INVENTION

The invention relates to a cheap and simple LED light source comprising LED loads, that is directly connectable to a supply source supplying a low frequency AC voltage such as the mains supply. The invention also relates to a method for operation of a LED light source, a phase cut dimmer compatibility module, the use of such a phase cut dimmer compatibility module, a dimmer, a luminaire, a lighting system and a LED light source suitable for use in such a system.

BACKGROUND OF THE INVENTION

A LED light source as mentioned in the first sentence is known from U.S. Pat. No. 7,081,722. The LED loads are LED arrays comprising series arrangements and possibly parallel arrangements of individual LEDs. The LED light source comprises a rectifier for rectifying the low frequency AC voltage. During operation a periodical DC voltage with a frequency 2 f and an amplitude varying between zero Volt and a maximum amplitude is present between the output terminals of the rectifier. A series arrangement of the N LED loads is coupled between the output terminals of the rectifier. The LED light source is further equipped with control means for during half a period of the low frequency AC voltage, in other words during a period of the periodical DC voltage, subsequently making the LED loads carry a current, one by one and in dependency of the momentary amplitude of the low frequency AC supply voltage when the amplitude increases and for subsequently making the LED loads stop carrying a current, one by one and in dependency of the momentary amplitude of the low frequency AC supply voltage when the momentary amplitude decreases.

When the amplitude of the periodical DC voltage is zero Volt, none of the LED loads carries a current. When the amplitude of the periodical DC voltage increases, a voltage is reached at which the first LED load starts carrying a current. Similarly, when the amplitude of the periodical DC voltage has increased further to a high enough value, the second LED load starts conducting. Upon further increase of the amplitude of the periodical DC voltage, the remaining LED loads subsequently start carrying a current. When all of the LED loads carry a current, the amplitude of the periodical DC voltage increases further until the maximum amplitude is reached. After that, the amplitude of the periodical DC voltage starts decreasing. While the amplitude decreases the LED loads stop conducting a current one by one. After the first LED load has stopped conducting, the amplitude of the periodical DC current decreases further to zero and then the cycle described here-above is repeated.

The known LED light source is very compact and comparatively simple. Furthermore, it can be directly supplied from a low frequency AC supply voltage source such as the mains supply and no circuitry for conversion of the low frequency AC supply voltage into substantially constant DC voltage is necessary. A disadvantage of the known LED light source is that it is incompatible with the existing phase cut dimmers that are used on a very large scale in homes and office buildings. In the further text "LED light sources that are incompatible with the existing phase cut dimmers" are also referred to as "non dimmable LED light sources" and also indicate LED light sources that can only be dimmed over a very limited range or only show reasonable dimming behaviour when dimmed with a trailing edge dimmer. It is desirable to make the known LED light source compatible with a wide range of both leading edge and trailing edge phase cut dimmers, also referred to as wall dimmers, to thereby further increase their possible uses.

SUMMARY OF THE INVENTION

It is an object of the invention to provide a LED light source that is compatible with a phase cut dimmer and is very compact.

According to a first aspect of the invention a LED light source is provided, suitable to be dimmed by a phase cut dimmer and comprising
 a rectifier equipped with a first input terminal and a second input terminal for coupling to output terminals of the phase cut dimmer, supplying an AC supply voltage,
 a series arrangement comprising N LED loads, a first and second end of said series arrangement being coupled to a first output terminal and a second output terminal of the rectifier respectively,
 control means for during a period of the rectified AC supply voltage subsequently making the LED loads comprised in the series arrangement carry a current, one by one and in dependency of the momentary amplitude of the rectified AC supply voltage when the momentary amplitude increases and for subsequently making the LED loads stop carrying a current, one by one, and in dependency of the momentary amplitude of the rectified AC supply voltage when the momentary amplitude decreases, said control means controlling the current through the LED loads at zero when the output voltage of the phase cut dimmer equals zero and controlling the current through the LED loads at a value that is independent from the phase angle of the phase cut dimmer when the output voltage of the phase cut dimmer differs from zero Volt,
 a switchable bleeder current source coupled between the first and second output terminal of the rectifier,
 a latch coupled between the first and second output terminals of the rectifier and comprising a series arrangement comprising a resistor and a capacitor to prevent the current through the dimmer from crossing zero after a leading edge generated by the phase cut dimmer, in case the phase cut dimmer is a leading edge phase cut dimmer,
 a unidirectional element arranged in series with the capacitor, and
 a clamp circuit coupled to the capacitor and comprising a current source for discharging the capacitor and providing a low ohmic path for the dimmer current when the phase cut dimmer is off.

Such a LED light source is cheap since only a comparatively small number of components is needed and is therefore also very compact. Furthermore, the LED light source has a very high power factor when used in undimmed operation. In dimmed operation very low dim levels can be realized.

According to a second aspect of the invention a method is provided for dimmed operation of a LED light source equipped with a series arrangement of N LED loads comprising the steps of
 providing an AC supply voltage with frequency f,
  interrupting the AC supply voltage in each half period during an adjustable time lapse,
  rectifying the interrupted AC supply voltage by means of a rectifier, and supplying the rectified interrupted AC voltage to the series arrangement comprising N LED loads,
  during a period of the rectified interrupted AC supply voltage subsequently making the LED loads carry a current, one by one, in dependency of the momentary amplitude of the rectified AC supply voltage, when the momentary amplitude increases, subsequently making the LED loads stop carrying a current, one by one, in dependency of the momentary amplitude of the AC supply voltage, when the momentary amplitude decreases, and maintaining the LED loads in a non-conducting state during the interruptions of the AC supply voltage source during which the momentary amplitude of the rectified interrupted supply voltage is zero, controlling the current through the LED loads at a value that is independent from the phase angle of the phase cut dimmer when the output voltage of the phase cut dimmer differs from zero Volt, and also the simultaneous steps of providing a switchable bleeder current source coupled between the first and second output terminal of the rectifier and maintaining a flow of current through the dimmer using the adjustable bleeder current source, when the amplitude of the rectified interrupted supply voltage is higher than zero Volt and the LED loads are not carrying a current, providing a latch coupled between the first and second output terminal of the rectifier and comprising a series arrangement of a resistor and a capacitor and using the latch to prevent the current through the dimmer from crossing zero after a leading edge generated by the phase cut dimmer at the end of an interruption, in case the phase cut dimmer is a leading edge phase cut dimmer, providing a unidirectional element arranged in series with the capacitor and with the resistor preventing discharging of the capacitor via the LED loads or the adjustable bleeder current source, and providing a clamp circuit coupled to the capacitor and comprising a current source and discharging the capacitor using the clamp circuit and providing a low ohmic path for the dimmer current using the clamp circuit when the dimmer is off.

According to a third aspect of the invention, a phase cut dimmer compatibility module is provided comprising a rectifier equipped with a first input terminal and a second input terminal for connection to the output terminals of a phase cut dimmer, a latch coupled between output terminals of the rectifier and comprising a series arrangement of a resistor and a capacitor to prevent the dimmer current to cross zero after a leading edge, in case the phase cut dimmer is a leading edge dimmer, a unidirectional element arranged in series with the capacitor, and a clamp circuit coupled to the capacitor and comprising a current source for discharging the capacitor and providing a low ohmic path for the dimmer current when the dimmer is off, and a conductive branch connecting the output terminals of the rectifier.

Such a dimmer compatibility module offers the possibility to dim one or more LED light sources, that are not compatible with a phase cut dimmer, without having to equip each LED light source with all the features necessary for compatibility. According to a fourth aspect of the invention a lighting system is provided, suitable for dimming with a phase cut dimmer and comprising at least one LED light source that is not compatible with a phase cut dimmer, and a phase cut dimmer compatibility module as described here-above.

During operation input terminals of the at least one LED light source and the first and second input terminals of the phase cut dimmer compatibility module are all connected to output terminals of a phase cut dimmer. Therefore it is possible to connect the first and second input terminal of the phase cut dimmer compatibility module and input terminals of the at least one LED light source to connection terminals for connection to the output terminals of a phase cut dimmer. The lighting system may comprise just one light source, but preferably the lighting system comprises two or more LED light sources. In this latter case the first and second input terminal of the phase cut dimmer compatibility module and the input terminals of all the LED light sources can be connected to the same connection terminals. The important advantage also of the lighting system is that it is not necessary to equip each LED light source with all the features necessary for compatibility with a phase cut dimmer.

According to a fifth aspect of the invention a lighting system suitable for dimming with a phase cut dimmer is provided, comprising at least one LED light source that is not compatible with a phase cut dimmer, and a LED light source according to the first aspect of the invention.

During operation input terminals of the at least one LED light source and the first and second input terminals LED light source according to the first aspect of the invention (further referred to as dimmable LED light source) are all connected to output terminals of a phase cut dimmer. Therefore it is possible to connect the first and second input terminal of the dimmable LED light source and input terminals of the at least one LED light source to connection terminals for connection to the output terminals of a phase cut dimmer. The lighting system may comprise just one LED light source that is not compatible with a phase cut dimmer, but preferably the lighting system comprises two or more LED light sources. In this latter case the first and second input terminal of the dimmable LED light source and the input terminals of all the LED light sources can be connected to the same connection terminals. The important advantage also of the lighting system is that it is not necessary to equip each LED light source comprised in the lighting system with all the features necessary for compatibility with a phase cut dimmer.

According to a sixth aspect of the invention a LED light source that is not compatible with a phase cut dimmer is provided, suitable for use in lighting systems according to the fourth and fifth aspect of the invention, comprising a rectifier equipped with a first input terminal and a second input terminal for connection to the output terminals of a phase cut dimmer, a series arrangement comprising N LED loads, a first and second end of said series arrangement being respectively coupled to a first output terminal and a second output terminal of the rectifier respectively, control means for during a period of the rectified AC supply voltage subsequently making the LED loads comprised in the series arrangement carry a current, one by one and in dependency of the momentary amplitude of the rectified AC supply voltage when the momentary amplitude increases and for subsequently making the LED loads stop carrying a current, one by one, and in dependency of the momentary amplitude of the rectified AC supply voltage when the momentary amplitude decreases, and for maintaining the LED loads in a non-conducting state when the momentary amplitude of the voltage present between the output terminals of the phase cut dimmer is zero,
a switchable bleeder current source coupled between the first and second output terminal of the rectifier.

According to a seventh aspect of the invention a dimmer is provided comprising
a phase cut dimmer comprising input terminals for connection to a supply voltage source and output terminals,
a phase cut dimmer compatibility module according to the third aspect of the invention, wherein the first input terminal and the second input terminal of the phase cut dimmer compatibility module are connected to respective output terminals of the phase cut dimmer. One or more LED light sources, that are incompatible with a phase cut dimmer, can be dimmed with this dimmer, when they are connected in parallel to the phase cut dimmer compatibility circuit to the output terminals of the phase cut dimmer.

According to an eighth aspect of the invention, a luminaire is provided comprising
a phase cut dimmer compatibility module according to the third aspect of the invention,
connection terminals connected to the first input terminal and the second input terminal for connecting one or more LED light sources, that are not compatible with a phase cut dimmer, in parallel to the phase cut dimmer compatibility circuit.

When the input terminals of the phase cut dimmer compatibility circuit are connected to the output terminals of a phase cut dimmer, one or more LED light sources, that are incompatible with a phase cut dimmer, can be dimmed, when they are connected in parallel to the phase cut dimmer compatibility circuit.

Further elaborations of the invention are mentioned in the dependent claims.

BRIEF DESCRIPTION OF THE DRAWINGS

Embodiments of a LED light source according to the invention will be further described making use of a drawing.

In the drawing.

DESCRIPTION OF EMBODIMENTS

Figure 1:
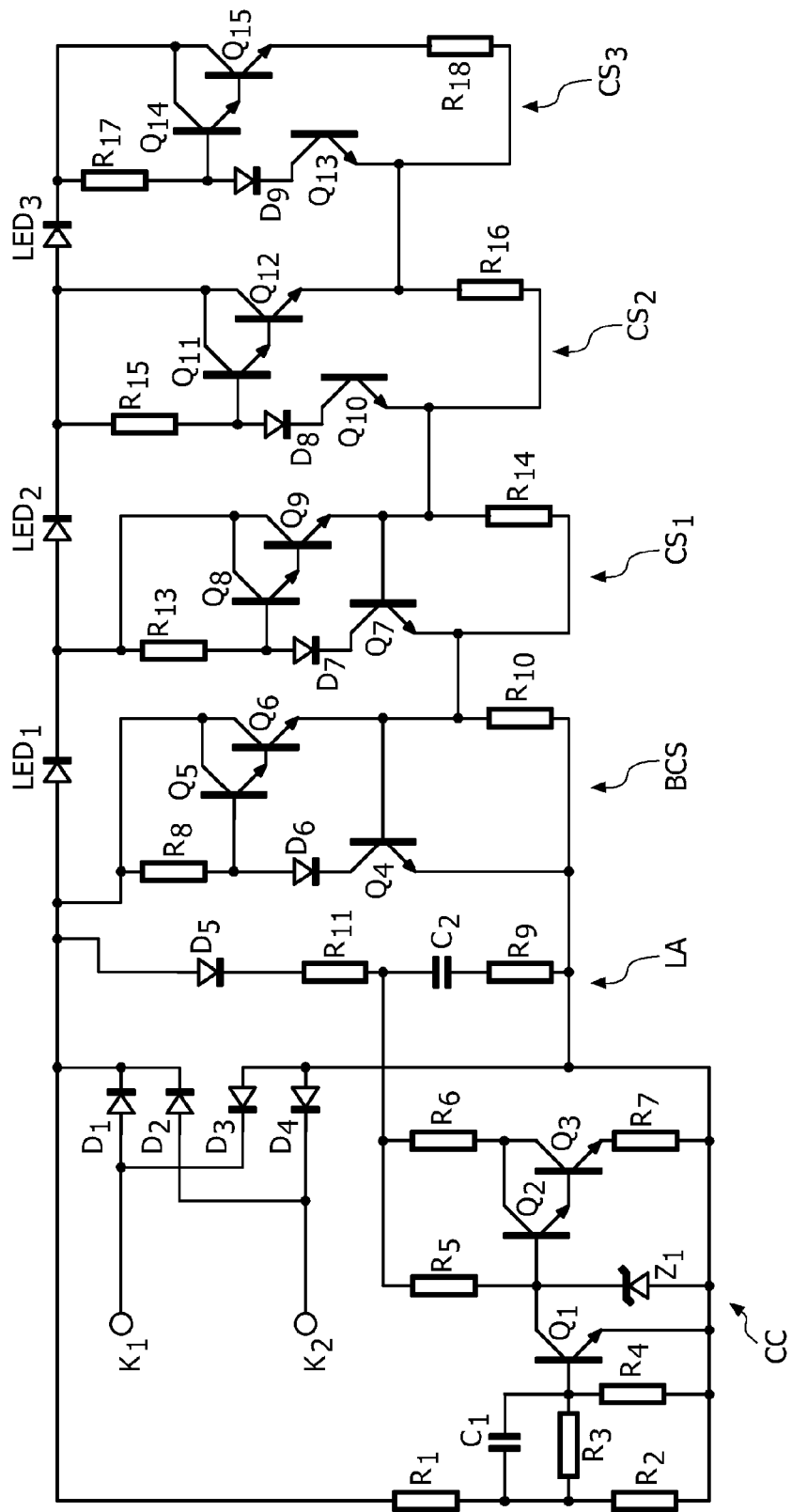
FIG. 1 shows a schematic representation of an embodiment of a LED light source according to the invention.

In FIG. 1, K1 and K2 are first and second input terminals of a full bridge rectifier (D1-D4) for coupling to output terminals of a phase cut dimmer. A first output terminal of the full bridge rectifier is connected to a second output terminal of the full bridge rectifier by means of a bleeder current source BCS comprising a parallel arrangement of a first series arrangement of resistor R8, diode D6 and transistor Q4 and a second series arrangement of a Darlington formed by transistors Q5 and Q6 and resistor R10. A base electrode of transistor Q5 is connected to a terminal between diode D6 and resistor R8, and a base electrode of transistor Q4 is connected to a terminal between transistor Q6 and resistor R10. The first output terminal and the second output terminal of the full bridge rectifier are also connected by means of a series arrangement of a diode D5, a resistor R11, a capacitor C2 and a resistor R9. Resistors R11, R9 and capacitor C2 together form a latch LA to prevent the current through the dimmer from crossing zero after a leading edge generated by the phase cut dimmer in case the phase cut dimmer is a leading edge phase cut dimmer. The leading edge causes an oscillation of an LC-combination comprised in an EMI filter comprised in the dimmer. This oscillation can cause the current through the dimmer to become so low that the dimmer switches off. This is prevented by damping the oscillation by means of the latch. Diode D5 is a unidirectional element for preventing discharging of the capacitor C2 via the LED loads or via the adjustable bleeder current source.

The first output terminal of the full bridge rectifier is also connected to the second output terminal by means of a series arrangement of resistors R1 and R2. Resistor R2 is shunted by a series arrangement of capacitor C1 and resistor R4. A common terminal of resistor R4 and capacitor C1 is connected to a common terminal of resistor R1 and R2 by means of resistor R3 and also directly to a base electrode of transistor Q1. A series arrangement of transistor Q1 and resistor R5 shunts the series arrangement of capacitor C2 and resistor R9. Transistor Q1 is shunted by zenerdiode Z1. The series arrangement of resistor R5 and transistor Q1 is also shunted by a series arrangement of resistor R6, a Darlington formed by transistors Q2 and Q3 and resistor R7. A base electrode of transistor Q2 is connected to a common terminal of resistor R5 and transistor Q1. Resistors R1, R2, R3, R4, R5, R6 and R7, capacitor C1, zener diode Z1 and transistors Q1, Q2 and Q3 together form a clamp circuit CC coupled to the capacitor C2 and comprising a current source for discharging the capacitor and providing a low ohmic path for the dimmer current when the dimmer is off. The current source is formed by zener diode Z1, resistors R6 and R7 and transistors Q2 and Q3.

The first output terminal of the full bridge rectifier is connected to a first end of a series arrangement comprising LED loads LED1, LED2 and LED3. A cathode of LED load LED1 is connected to a first end of a first current source that comprises a parallel arrangement of a first series arrangement of resistor R13, diode D7 and transistor Q7 and a second series arrangement of a Darlington formed by transistors Q8 and Q9 and resistor R14. A base electrode of transistor Q8 is connected to a terminal between diode D7 and resistor R13, and a base electrode of transistor Q7 is connected to a terminal between transistor Q9 and resistor R14. Similarly, the cathode of LED load LED2 is connected to a first end of a second current source comprising a parallel arrangement of a first series arrangement of resistor R15, diode D8 and transistor Q10 and a second series arrangement of a Darlington formed by transistors Q11 and Q12 and resistor R16. A base electrode of transistor Q11 is connected to a terminal between diode D8 and resistor R15 and a base electrode of transistor Q10 is connected to a terminal between transistor Q12 and resistor R16. The cathode of the third LED load LED3 is connected to a first end of a third current source comprising a parallel arrangement of a first series arrangement of resistor R17, diode D9 and transistor Q13 and a second series arrangement of a Darlington formed by transistors Q14 and Q15 and resistor R18. A base electrode of transistor Q14 is connected to a terminal between diode D9 and resistor R17, and a base electrode of transistor Q13 is connected to a terminal between transistor Q15 and resistor R18.

A second end of the third current source, formed by a common terminal of transistor Q13 and resistor R18, is connected to a common terminal of transistor Q12 and resistor R16 in the second current source. Similarly, a second end of the second current source, formed by a common terminal of transistor Q10 and resistor R16, is connected to a common terminal of transistor Q9 and resistor R14 in the first current source. Also a second end of the first current source, formed by a common terminal of transistor Q7 and resistor R14, is connected to a common terminal of transistor Q6 and resistor R10 in the bleeder current source BCS. Thus the series arrangement of the three LED loads LED1, LED2 and LED3, resistor R17, diode D9, transistor Q13 and resistors R16, R14 and R10 together form a series arrangement comprising the LED loads and connecting the output terminals of the full bridge rectifier.

The operation of the LED light source shown in FIG. 1 is as follows.

Figure 2:
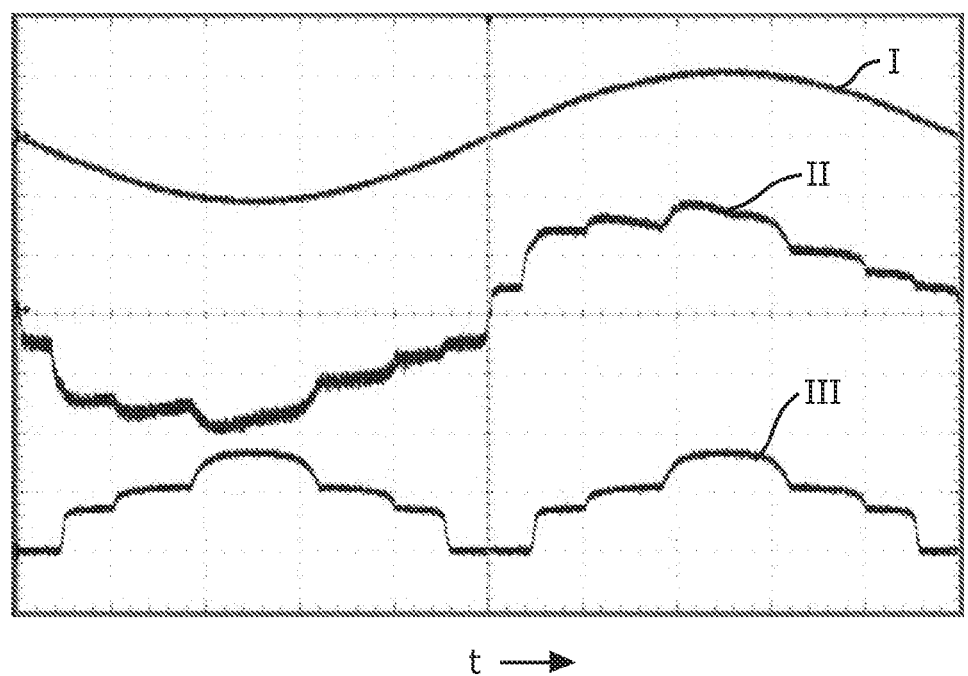
FIG. 2 shows the shape of the input voltage, input current and LED current for undimmed operation of the LED light source shown in FIG. 1.

In case the first input terminal K1 and the second input terminal K2 are connected to the output terminals of a phase cut dimmer, of which the input terminals are connected to a supply voltage source supplying an AC supply voltage, and the phase angle of the phase cut dimmer is adjusted to zero, the operation of the LED light source is undimmed, or in other words the dimmer does not at all interrupt the AC supply voltage present at its input terminals. The supply voltage present at the input terminals K1 and K2 is thus sinusoidally shaped as shown in curve I in FIG. 2.

The full bridge rectifier rectifies this sinusoidally shaped supply voltage and the rectified voltage is present between the output terminals of the full bridge rectifier. At the beginning of each period of the rectified supply voltage, the momentary amplitude of the rectified supply voltage becomes higher than zero and a current starts to flow through resistor R8 and the base emitter junctions of transistors Q5 and Q6 and resistor R10. This current renders the transistor Q6 conductive so that more current starts to flow through resistor R10 via transistor Q6. As the voltage across resistor R10 increases, transistor Q4 is rendered conductive and a balance is established between the current conducted by transistors Q6 and Q4, so that the series arrangement of resistor R8, diode D6 and Q4 together with the series arrangement of resistor R10 and the Darlington formed by transistors Q5 and Q6 form a current source. The current carried by this current source does not flow through one or more of the LED loads but does flow through the switch comprised in the phase cut dimmer. Many phase cut dimmers comprise a switch that will become non-conductive in case the current through it drops below a predetermined value. Before the momentary amplitude of the rectified supply voltage has increased to a value high enough to cause the first LED load LED1 to start carrying a current, the only current through the switch is the current drawn by the bleeder current source and this current is necessary to keep the switch comprised in the phase cut dimmer conductive. It can be seen in FIG. 2 that during this stage of the operation there is an input current to the LED light source (curve II), but the current through the LED loads (curve III) is zero.

When the momentary amplitude of the rectified supply voltage has increased to a value high enough to cause the first LED load LED1 to start carrying a current, the current source CS1 becomes conducting in the same way as described here-above for the bleeder current source BCS. All the current that flows through current source CS1 adds to the current flowing through resistor R10 comprised in the bleeder current source. As a consequence the voltage at the base electrode of transistor Q4 increases while the voltage at the collector of this transistor decreases. Via this "pinching off" mechanism the bleeder current source BCS is switched off when the first current source CS1 has become conductive. At this stage LED load LED1 and the first current source CS1 carry a current. Similarly, when the momentary amplitude of the rectified supply voltage has increased to a value high enough to cause the second LED load LED2 to start carrying a current, the current source CS2 becomes conducting. The second current source CS2 renders the first current source CS1 non-conductive via the pinching off mechanism. At this stage LED loads LED1 and LED2 and current source CS2 carry a current. A further increase of the rectified supply voltage causes the third LED load LED3 and the third current source CS3 to become conductive and the second current source CS2 to be switched off. At this stage all the LED loads and only current source CS3 carry a current.

After the momentary amplitude of the rectified supply voltage has increased to its maximum, it starts to decrease and when it drops below the value needed to maintain the third LED load LED3 conductive, LED load LED3 and the third current source CS3 become non-conducting and the second current source CS2 becomes conducting. Upon further decrease of the momentary amplitude of the rectified voltage, the second LED load LED2 and the second current source CS2 become non-conducting and the first current source CS1 becomes conducting. Still further decrease of the momentary amplitude of the rectified supply voltage causes the first LED load LED1 and the first current source CS1 to become non-conducting and the bleeder current source BCS to become conducting. The bleeder current source BCS stays conducting until the momentary amplitude of the rectified supply voltage drops to zero at the end of a period of the rectified supply voltage. In the next period the sequence of events described here-above is repeated.

In case of dimmed operation, the phase cut dimmer interrupts the AC supply voltage during a part of each half period of the AC supply voltage. During the interruptions voltage present between the input terminals K1 and K2 equals zero. Generally two types of phase dimming exist: leading edge (LE) and trailing edge (TE).

Figure 3A:
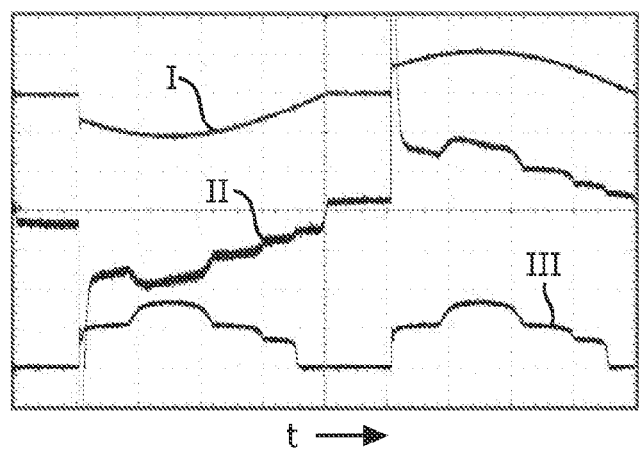
FIG. 3 (FIG. 3A, FIG. 3B and FIG. 3C) shows the shape of input voltage, input current and LED current for dimmed operation of the LED light source shown in FIG. 1 in case a leading edge phase cut dimmer is used.
Figure 3B:
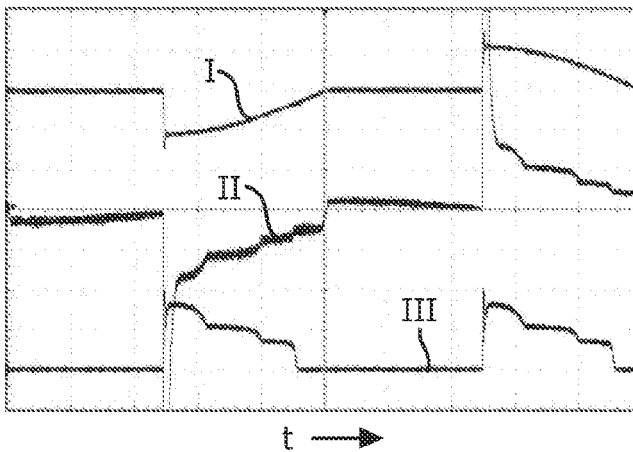
Figure 3C:
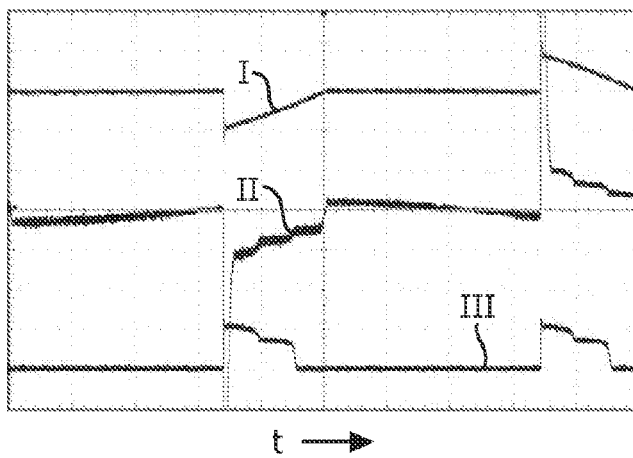

In case of leading edge, the first part of each half period of the AC supply voltage is interrupted so that the voltage present at the input terminals of the full bridge rectifier equals zero. As a consequence the current through the LED loads is also zero. At the end of the interruption, when the dimmer switch becomes conductive, the momentary amplitude of the voltage at the input terminals rises steeply to its normal (i.e. not interrupted) value thereby producing a "leading edge" as can be seen in curve I of FIG. 3A, FIG. 3B and FIG. 3C for three different values of the phase angle of the phase cut dimmer. These three different values of the phase angle correspond to three different durations of the time lapse in each half period of the supply voltage, during which the AC supply voltage is interrupted. In case this normal voltage is higher than the forward voltage of the first LED load LED1, at least this LED load will start carrying a current. In case the normal voltage is not (yet) higher than the forward voltage of the first LED load, the bleeder current source will start carrying a current. Until the next zero crossing of the AC supply voltage, the operation of the LED light source will be the same as the undimmed operation described here-above. After the zero crossing of the AC supply voltage, the voltage at the input terminals of the full bridge rectifier equals zero and the cycle is repeated.

Figure 4A:
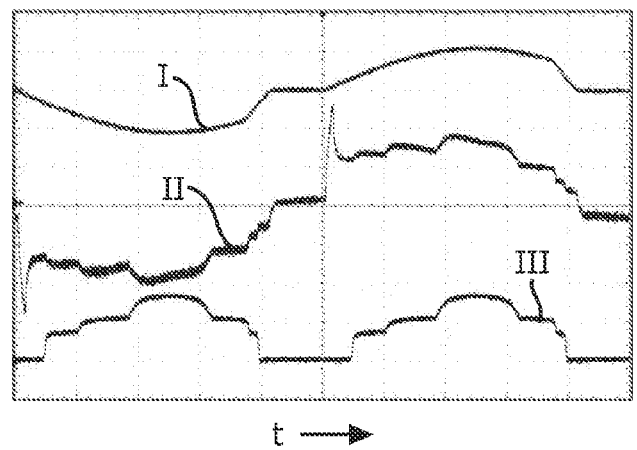
FIG. 4 (FIG. 4A, FIG. 4B and FIG. 4C) shows the shape of input voltage, input current and LED current for dimmed operation of the LED light source shown in FIG. 1 in case a trailing edge phase cut dimmer is used.
Figure 4B:
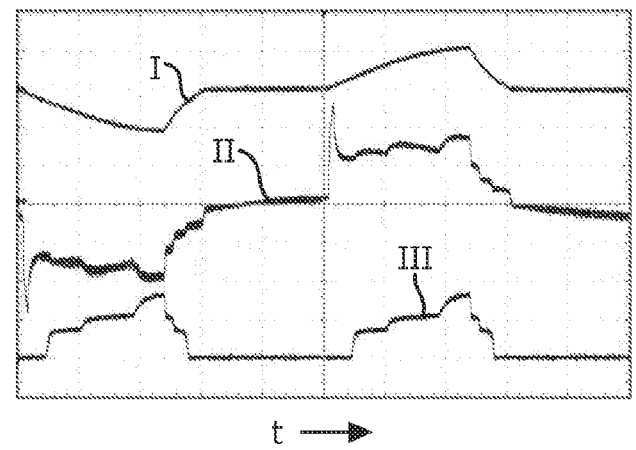
Figure 4C:
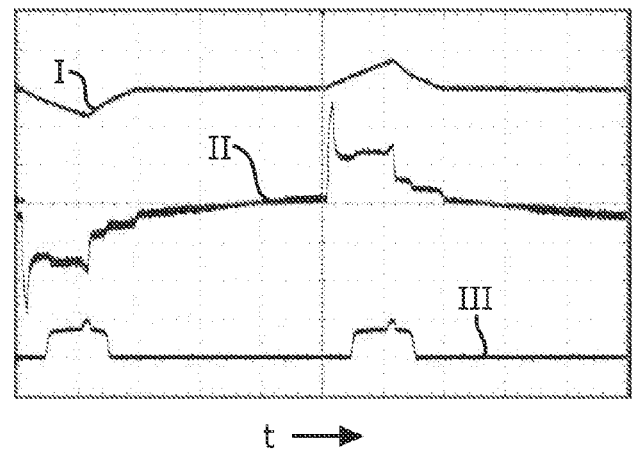

In case of a trailing edge, the interruption of the AC supply voltage is during the last part of each half period of the AC supply voltage so the last part of each half period of the voltage present at the input terminal is zero and the first part has a normal amplitude. When the dimmer switch becomes non-conductive the momentary amplitude of the voltage decreases to zero, causing a "trailing edge" as can be seen in curve I of FIG. 4A, FIG. 4B and FIG. 4C, for three different values of the phase angle of the phase cut dimmer. These three different values of the phase angle correspond to three different durations of the time lapse in each half period of the supply voltage, during which the AC supply voltage is interrupted.

Both FIG. 3 and FIG. 4 show in curves II and III that the input current to the LED light source and the current through the LED loads are approximately zero when the voltage between the input terminals of the full bridge rectifier is zero. In case of trailing edge dimming, the operation of the LED light source is similar to undimmed operation as long as the voltage at the input terminals of the full bridge rectifier differs from zero. When this voltage drops to zero because the dimmer switch is rendered non-conducting, the current through the LEDs drops to zero.

In case of leading edge dimming, the leading edge charges capacitor C2 through diode D5 and resistors R11 and R9. The latch LA together with diode D5 prevents the current through the dimmer from crossing zero and thereby prevents the dimmer switch from becoming non-conductive.

Since the capacitor C2 needs to be discharged before the next leading edge occurs in the next half period the clamp circuit CC is incorporated in the LED light source to discharge this capacitor. When the momentary amplitude of the rectified supply voltage is high, the voltage across resistor R2 is high and transistor Q1 is conductive so that transistors Q2 and Q3 are non-conductive. As a consequence current cannot flow through the low impedance path formed by resistor R6, transistor Q3 and resistor R7. In this way a high power dissipation is prevented. However, when the momentary amplitude of the AC supply voltage decreases, the momentary amplitude of the rectified input voltage also decreases by means of the current through the current sources CS1, CS2 and CS3 and the bleeder current source BCS, so that the momentary amplitude is low in the vicinity of a zero crossing of the AC supply voltage. The voltage across resistor R2 is thus low, so that transistor Q1 is not conductive and both transistors Q2 and Q3 are conductive. Capacitor C2 can then be effectively discharged via the low impedance path formed by resistor R6, transistor Q3 and resistor R7. Furthermore during the first part of the next half period the AC supply voltage is interrupted so that the low impedance path formed by resistor R6, transistor Q3 and resistor R7 is conductive. During this interruption a capacitor comprised in the dimmer is charged to a value at which the dimmer switch is rendered conductive and the charging current is supplied to the LED light source. In order to maintain accurate timing of the moment at which the dimmer switch becomes conductive over the dimming range it is essential that this charging current causes only a very small voltage, again demanding a low impedance current path, in this case formed by D5, R11, R6, Q3 and R7. When transistor Q2 and Q3 are conductive they form a current source together with zener diode Z1.

In case the dimmer switch is rendered conductive before the momentary amplitude of the AC supply voltage is higher than the forward voltage of the first LED load LED1, but at a value high enough to make transistor Q1 conductive, the current source in the clamp circuit becomes non-conductive and the bleeder current source starts conducting. In case the dimmer switch is rendered conductive when the momentary amplitude of the AC supply voltage is higher than the forward voltage of the first LED load LED1, or even higher than the sum of the forward voltages of the first two or all three LED loads, these LED loads start conducting immediately after the dimmer switch has become conductive and the current source in the clamp circuit CC becomes non-conductive.

Figure 6:
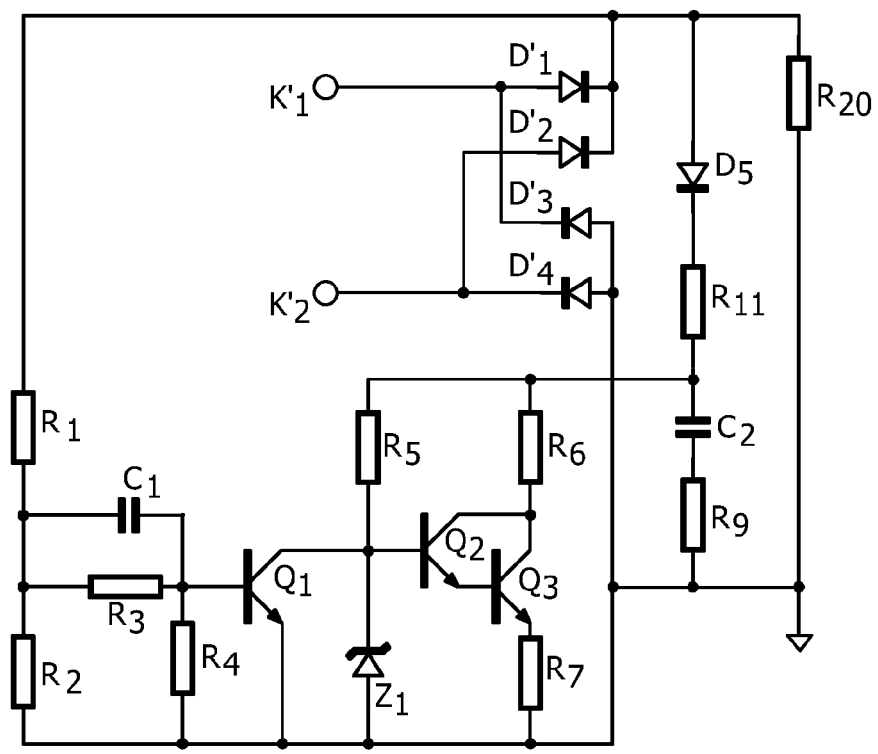
FIG. 6 shows a phase cut dimmer compatibility module.
Figure 7:
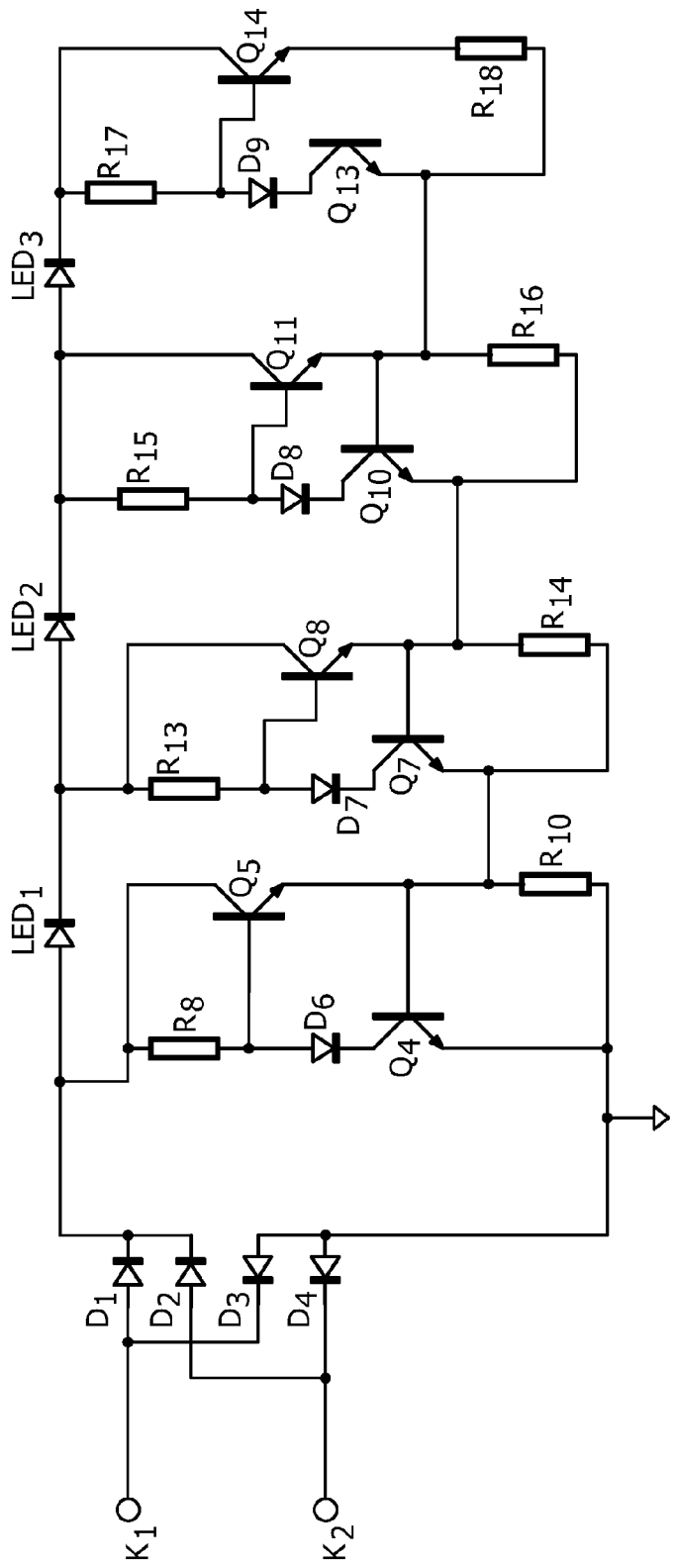
FIG. 7 shows a non-dimmable LED light source that can be made dimmable by combining it with a phase cut dimmer compatibility module as shown in FIG. 6.

FIG. 6 shows a phase cut dimmer compatibility module, and FIG. 7 shows a non-dimmable LED light source that can be made dimmable by combining it with a phase cut dimmer compatibility module as shown in FIG. 6. It is noted that a non-dimmable LED light source means a LED light source that is not compatible with a phase cut dimmer. The phase cut dimmer compatibility module and the non-dimmable LED light source together form a lighting system suitable for being dimmed with a phase cut dimmer.

As can be seen in FIG. 6, the dimmer compatibility module is to a large extent identical to part of the circuitry comprised in the LED light source shown in FIG. 1. The dimmer compatibility module comprises a full bridge rectifier formed by diodes D1'-D4'. The full bridge rectifier has input terminals K1' and K2' for connection to the output terminals of a phase cut dimmer. A first output terminal of the full bridge rectifier and a second output terminal of the full bridge rectifier are connected by means of a series arrangement of a diode D5, a resistor R11, a capacitor C2 and a resistor R9. Resistors R11, R9 and capacitor C2 together form a latch LA to prevent the current through the dimmer from crossing zero after a leading edge generated by the phase cut dimmer in case the phase cut dimmer is a leading edge phase cut dimmer. Diode D5 is a unidirectional element for preventing discharging of the capacitor C2 via R11. The first output terminal of the full bridge rectifier is connected to the second output terminal by means of a series arrangement of resistors R1 and R2. Resistor R2 is shunted by a series arrangement of capacitor C1 and resistor R4. A common terminal of resistor R4 and capacitor C1 is connected to a common terminal of resistor R1 and R2 by means of resistor R3 and also directly to a base electrode of transistor Q1. A series arrangement of transistor Q1 and resistor R5 shunts the series arrangement of capacitor C2 and resistor R9. Transistor Q1 is shunted by zenerdiode Z1. The series arrangement of resistor R5 and transistor Q1 is also shunted by a series arrangement of resistor R6, a Darlington formed by transistor Q2 and Q3 and resistor R7. A base electrode of transistor Q2 is connected to a common terminal of resistor R5 and transistor Q1. Resistors R1, R2, R3, R4, R5, R6 and R7, capacitor C1, zener diode Z1 and transistors Q1, Q2 and Q3 together form a clamp circuit CC coupled to the capacitor C2 and comprising a current source for discharging the capacitor and providing a low ohmic path for the dimmer current when the dimmer is off. The current source is formed by zener diode Z1, resistors R6 and R7 and transistors Q2 and Q3. The output terminals of the rectifier are also connected by means of resistor R20, in this embodiment forming a conductive branch. This conductive branch allows the voltage at the first output terminal of the rectifier to drop when the amplitude of the AC supply voltage drops. Diode D5 makes it possible that the voltage at the voltage at the first output terminal drops, although capacitor C2 is still charged. This voltage drop at the first output terminal of the rectifier is necessary to activate the current source formed by zener diode Z1, resistors R6 and R7 and transistors Q2 and Q3. In the circuitry of FIG. 1 this voltage drop at the first output terminal of the rectifier is realized by the bleeder current source BCS and the current sources CS1, CS2 and CS3. It is remarked that instead of a resistor, the conductive branch could for instance also comprise a bleeder current source.

The non-dimmable LED light source in FIG. 7 is to a large extent similar to the LED light source shown in FIG. 1. It comprises a full bridge rectifier, a bleeder current source, three LED loads and the current sources coupled to said LED loads. The difference between the LED light source in FIG. 1 and the non-dimmable LED light source in FIG. 7 is that the latch LA, the unidirectional element D5 and the clamp circuit CC are dispensed with. It is noted that the non-dimmable LED light source is preferably so arranged that during operation there is no phase shift between the input voltage and the input current, so that it forms an ohmic load.

Figure 5:
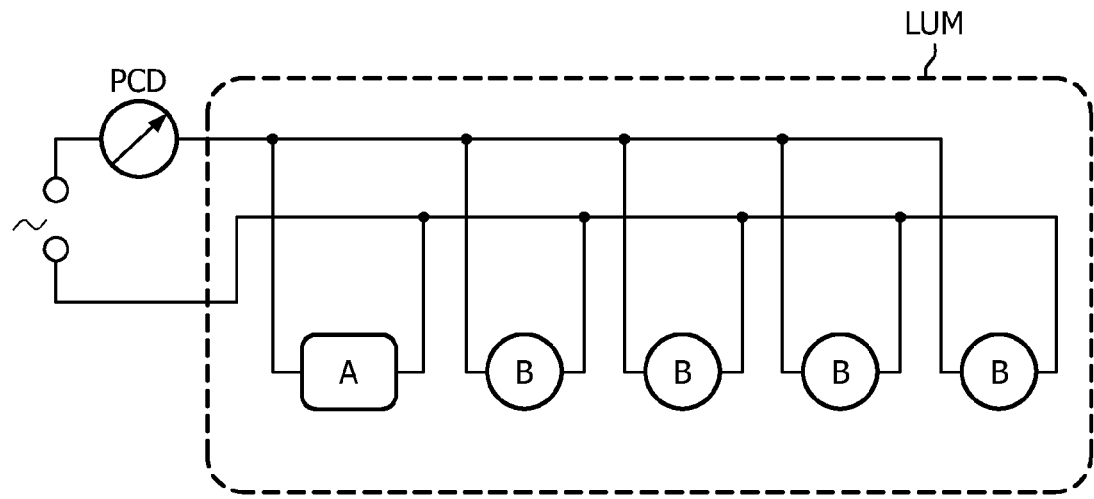
FIG. 5 shows a luminaire containing a number of LED light sources coupled to a phase cut dimmer.

The non-dimmable LED light source shown in FIG. 7 can be directly connected to an AC supply voltage source such as the mains supply and can then operate at nominal power (undimmed). Similarly, in case the non-dimmable LED light source is connected to the output terminals of a phase cut dimmer, operation of the LED light source at nominal power, when the switch comprised in the phase cut dimmer is always conducting, is possible. This operation is similar to the operation of the LED light source shown in FIG. 1, when the dimmer switch is always conducting, described here-above. However, in case the phase angle of the phase cut dimmer is adjusted so that the mains supply is interrupted part of the time in each half period, operation of the non-dimmable LED light source is no longer possible because the non dimmable LED light source does not comprise a latch and a clamp circuit. The non-dimmable LED light source can, however, be made dimmable by connecting a dimmer compatibility module in parallel with it to the output terminals of the same phase cut dimmer. In that case dimming can take place in the same way as described for the LED light source shown in FIG. 1, because the missing latch and clamp circuit are provided by the dimmer compatibility circuit. In fact it is possible to transform a number of non-dimmable LED light sources into dimmable (i.e. compatible with a phase cut dimmer) LED light sources, by connecting the non-dimmable LED light sources in parallel with a single dimmer compatibility circuit to the output terminals of the same phase cut dimmer. This is illustrated in FIG. 5, wherein a luminaire LUM is shown having a number of non-dimmable LED light sources B connected in parallel to a dimmer compatibility circuit A. The parallel arrangement of the non-dimmable LED light sources and the dimmer compatibility circuit is connected to output terminals of a phase cut dimmer PCD. The operation of the non-dimmable LED light sources in combination with the dimmer compatibility circuit is similar to the operation of the LED light source in FIG. 1.

Alternatively a non-dimmable LED light source may also be made dimmable by connecting the non-dimmable LED light source in parallel to a dimmable LED light source as shown in FIG. 1 to the output terminals of the same phase cut dimmer. Also in this case a number of non-dimmable LED light sources can be made dimmable by connecting them all in parallel to a dimmable LED light source to the output terminals of the same phase cut dimmer. As a consequence, in FIG. 5 "A" can be a dimmer compatibility circuit but can also be a dimmable LED light source as shown in FIG. 1.

Figure 8:
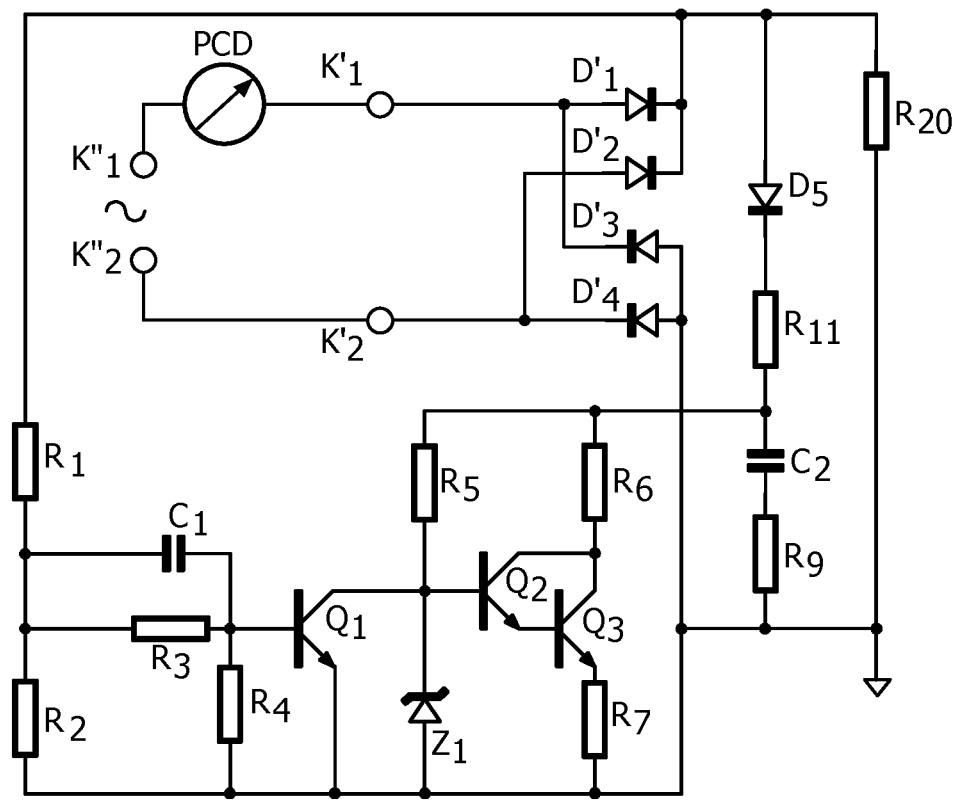
FIG. 8 shows a dimmer comprising a phase cut dimmer and a phase cut dimmer compatibility module.

FIG. 8 shows a dimmer comprising a phase cut dimmer PCD and a dimmer compatibility module as shown in FIG. 6. K1" and K2" are input terminals of the phase cut dimmer. Output terminals of the phase cut dimmer PCD are connected to respective input terminals K1' and K2' of the dimmer compatibility module. One or more LED light sources that are not compatible with phase cut dimmers can be dimmed with this dimmer when their input terminals are connected to the output terminals of the phase cut dimmer.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The invention claimed is:

1. A device, comprising:
a rectifier equipped with a first input terminal and a second input terminal for coupling to output terminals of a phase cut dimmer, supplying an AC supply voltage,
a series arrangement comprising N LED loads, a first and second end of said series arrangement being coupled to a first output terminal and a second output terminal of the rectifier respectively,
control means, comprising N current sources, each current source coupled between the cathode of a respective LED load and the second output terminal of the rectifier for during a period of the rectified AC supply voltage subsequently and sequentially making the LED loads comprised in the series arrangement carry a current, one by one and in dependency of the momentary amplitude of the rectified AC supply voltage when the momentary amplitude increases and for subsequently making the LED loads stop carrying a current, one by one, and in dependency of the momentary amplitude of the rectified AC supply voltage when the momentary amplitude decreases, said control means controlling the current through the LED loads at zero when the output voltage of the phase cut dimmer equals zero and controlling the current through the LED loads at a value that is independent from the phase angle of the phase cut dimmer when the output voltage of the phase cut dimmer differs from zero Volt, and
a switchable bleeder current source coupled between the first output terminal and second output terminal of the rectifier,
wherein:
a latch is coupled between the first and second output terminals of the rectifier and comprising a series arrangement comprising a resistor and a capacitor to prevent the current through the dimmer from crossing zero after a leading edge generated by the phase cut dimmer, in case the phase cut dimmer is a leading edge phase cut dimmer,
a unidirectional element is arranged in series with the capacitor, and
a clamp circuit is coupled to the capacitor and comprises a current source for discharging the capacitor and providing a low ohmic path for the dimmer current when the phase cut dimmer is off.

2. The device of claim 1, wherein the switchable bleeder current source comprises a first series arrangement and a second series arrangement in parallel with the first series arrangement and coupled between output terminals of the rectifier, the first series arrangement comprising a first resistor and a first transistor and the second series arrangement comprising a second transistor and a second resistor and wherein a control electrode of the first transistor is connected to a terminal between the second transistor and the second resistor and a control electrode of the second transistor is connected to a terminal between the first transistor and the first resistor.

3. The device of claim 1, wherein the control means comprises N control strings comprising a switchable current source and connecting the cathode of a LED load to the second output terminal of the rectifier.

4. The device of claim 3,
wherein each of the current sources comprises a first series arrangement comprising a first resistor and a first switching element and a second series arrangement, in parallel with the first series arrangement, of a second switching element and a second resistor,
wherein a control electrode of the first transistor is connected to a terminal between the second transistor and the second resistor and a control electrode of the second transistor is connected to a terminal between the first transistor and the first resistor, and
wherein a first end of each current source is coupled to the cathode of a LED load and a second end of the nth current source is coupled to a terminal between the second transistor and the second resistor of the (n−1)th current source for 2≤n≤N, and to terminal between the second transistor and the second resistor of the bleeder current source for n=1.

5. The device of claim 1, further comprising
at least one LED light source that is not compatible with a phase cut dimmer.

6. The device of claim 1, further comprising:
connection terminals for connecting one or more LED light sources, that are not compatible with a phase cut dimmer, in parallel to the device.

7. The device of claim 6, wherein the one or more LED light sources are arranged that during operation there is no phase shift between an input voltage to the one or more LED light sources and an input current to the one or more LED light sources.

8. The device of claim 6, wherein the control means comprises N control strings comprising a switchable current source and connecting the cathode of a LED load to the second output terminal of the rectifier.

9. A method for dimmed operation of a light emitting diode (LED) light source equipped with a series arrangement of N LED loads, the method comprising:
providing an AC supply voltage with frequency (f),
interrupting the supply voltage in each half period during an adjustable time lapse,
rectifying the interrupted AC supply voltage by means of a rectifier, and supplying the rectified interrupted AC voltage to the series arrangement comprising N LED loads, during a period of the rectified interrupted AC supply voltage,
subsequently making the LED loads carry a current, one by one, in dependency of the momentary amplitude of the rectified AC supply voltage, when the momentary amplitude increases,
subsequently making the LED loads stop carrying a current, one by one, in dependency of the momentary amplitude of the AC supply voltage, when the momentary amplitude decreases, and
maintaining the LED loads in a non-conducting state during the interruptions of the AC supply voltage, during which the momentary amplitude of the rectified interrupted supply voltage is zero,
controlling the current through the LED loads at a value that is independent from the phase angle of the phase cut dimmer when the output voltage of the phase cut dimmer differs from zero Volt,
providing a switchable bleeder current source coupled between the first and second output terminal of the rectifier and maintaining a flow of current through the dimmer using the adjustable bleeder current source, when the amplitude of the rectified interrupted supply voltage is higher than zero Volt and the LED loads are not carrying a current,
providing a latch coupled between the first and second output terminal of the rectifier and comprising a series arrangement of a resistor and a capacitor and using the latch to prevent the current through the dimmer from crossing zero after a leading edge generated by the phase cut dimmer at the end of an interruption, in case the phase cut dimmer is a leading edge phase cut dimmer,
providing a unidirectional element arranged in series with the capacitor and with the resistor preventing discharging of the capacitor via the LED loads or the adjustable bleeder current source, and
providing a clamp circuit coupled to the capacitor and comprising a current source and discharging the capacitor using the clamp circuit and providing a low ohmic path for the dimmer current using the clamp circuit when the dimmer is off.

10. A device for supplying power to a non-dimmable light emitting diode (LED) light source, the device comprising:
a first input terminal and a second input terminal for connection to output terminals of a phase cut dimmer,
a rectifier equipped with rectifier input terminals connected to the first input terminal and the second input terminal, wherein
a latch is coupled between output terminals of the rectifier, and the latch comprising a series arrangement of a resistor and a capacitor to prevent the dimmer current from crossing zero after a leading edge, in case the phase cut dimmer is a leading edge dimmer,
a unidirectional element is arranged in series with the capacitor for preventing discharging of the capacitor via the non-dimmable LED light source,
a clamp circuit is coupled to the capacitor and comprising a current source for discharging the capacitor and providing a low ohmic path for a dimmer current of the phase cut dimmer when the phase cut dimmer is off, and
a conductive branch connecting the output terminals of the rectifier.

11. The device of claim 6, further comprising the non-dimmable LED light source comprising at least one LED.

12. The device of claim 10, further comprising:
connection terminals for connecting one or more LED light sources, that are not compatible with a phase cut dimmer, in parallel to the device.

13. The device of claim 10, further comprising
the phase cut dimmer, wherein the phase cut dimmer comprises input terminals for connection to a supply voltage source and output terminals.

* * * * *